(12) United States Patent
Liu et al.

(10) Patent No.: US 9,018,808 B2
(45) Date of Patent: Apr. 28, 2015

(54) ROTOR ASSEMBLY

(75) Inventors: Yonggang Liu, Zhongshan (CN); Chongsheng Zeng, Zhongshan (CN)

(73) Assignee: Zhongshan Broad-Ocean Motor Manufacturing Co., Ltd., Zhongshan (CN)

( * ) Notice: Subject to any disclaimer, the term of this patent is extended or adjusted under 35 U.S.C. 154(b) by 291 days.

(21) Appl. No.: 13/315,271

(22) Filed: Dec. 8, 2011

(65) Prior Publication Data

US 2012/0194011 A1    Aug. 2, 2012

(30) Foreign Application Priority Data

Jan. 28, 2011 (CN) .......................... 2011 2 0034755

(51) Int. Cl.
*H02K 1/28* (2006.01)
*H02K 1/30* (2006.01)
*H02K 1/27* (2006.01)

(52) U.S. Cl.
CPC ........... *H02K 1/30* (2013.01); *H02K 1/274* (2013.01); *H02K 1/278* (2013.01)

(58) Field of Classification Search
CPC ............................... H02K 1/278; H02K 1/274
USPC ................... 310/68 B, 156.07, 43, 156.01
See application file for complete search history.

(56) References Cited

U.S. PATENT DOCUMENTS

| | | | | |
|---|---|---|---|---|
| 4,543,506 A * | 9/1985 | Kawada et al. | .......... | 310/156.59 |
| 4,841,186 A * | 6/1989 | Feigel et al. | ............ | 310/156.12 |
| 4,954,736 A * | 9/1990 | Kawamoto et al. | ...... | 310/156.21 |
| 4,973,872 A * | 11/1990 | Dohogne | ................. | 310/156.28 |
| 5,041,749 A * | 8/1991 | Gaser et al. | .............. | 310/156.22 |
| 5,053,664 A * | 10/1991 | Kikuta et al. | ................. | 310/114 |
| 5,142,175 A * | 8/1992 | Watanabe | ..................... | 310/90.5 |
| 5,148,070 A * | 9/1992 | Frye et al. | ...................... | 310/168 |
| 5,161,361 A * | 11/1992 | Talley et al. | .................... | 57/264 |
| 5,306,123 A * | 4/1994 | Day et al. | .................. | 417/423.7 |
| 5,356,272 A * | 10/1994 | Nagata et al. | ................. | 417/366 |
| 5,774,974 A * | 7/1998 | Dunfield et al. | ................ | 29/596 |
| 5,945,753 A * | 8/1999 | Maegawa et al. | ........... | 310/68 B |
| 6,683,397 B2 * | 1/2004 | Gauthier et al. | ............ | 310/68 B |
| 7,215,052 B2 * | 5/2007 | Blase et al. | ..................... | 310/87 |
| 7,247,960 B2 * | 7/2007 | Nayak et al. | ................ | 310/68 B |
| 7,394,174 B2 * | 7/2008 | Blase et al. | ..................... | 310/43 |
| 7,500,848 B2 * | 3/2009 | Maeda et al. | ................. | 425/542 |
| 7,737,583 B2 * | 6/2010 | Bi | ................................... | 310/51 |
| 7,791,232 B2 * | 9/2010 | Purohit et al. | .............. | 310/68 B |
| 7,888,831 B2 * | 2/2011 | Court et al. | ................. | 310/68 B |
| 7,893,580 B2 * | 2/2011 | Kobayashi | ................... | 310/68 B |
| 2001/0048261 A1 * | 12/2001 | Kojima et al. | ........... | 310/156.13 |
| 2002/0047404 A1 * | 4/2002 | Coenen | ........................ | 310/90.5 |
| 2004/0119466 A1 * | 6/2004 | Akatsu et al. | ............. | 324/207.15 |
| 2005/0212366 A1 * | 9/2005 | Yoshiyama et al. | ........ | 310/68 B |

(Continued)

FOREIGN PATENT DOCUMENTS

JP    2002345186 A  * 11/2002

*Primary Examiner* — Alex W Mok
(74) *Attorney, Agent, or Firm* — Matthias Scholl P.C.; Matthias Scholl

(57) ABSTRACT

A rotor assembly including a rotating shaft, a rotor core, a permanent magnet, a magnetic ring support, and a magnetic ring. The permanent magnet is mounted on the outer side surface of the rotor core. The magnetic ring is nested on the magnetic ring support, and the magnetic ring support and the rotor core are made as a whole by injection molding. The rotor assembly is relatively simple to produce, low in cost, and features improved efficiency.

5 Claims, 6 Drawing Sheets

(56) References Cited

U.S. PATENT DOCUMENTS

| | | | |
|---|---|---|---|
| 2006/0071563 A1* | 4/2006 | Fujii | 310/68 R |
| 2006/0125334 A1* | 6/2006 | Kataoka et al. | 310/68 B |
| 2007/0029886 A1* | 2/2007 | Shiga | 310/68 B |
| 2007/0080597 A1* | 4/2007 | Suzuki et al. | 310/156.47 |
| 2007/0205686 A1* | 9/2007 | Ishida | 310/156.21 |
| 2008/0012434 A1* | 1/2008 | Jiang et al. | 310/43 |
| 2008/0252160 A1* | 10/2008 | Kavalsky et al. | 310/71 |
| 2008/0265698 A1* | 10/2008 | Bi | 310/51 |
| 2008/0284274 A1* | 11/2008 | Bi | 310/261 |
| 2009/0302718 A1* | 12/2009 | Court et al. | 310/68 B |
| 2010/0109491 A1* | 5/2010 | Miyazaki et al. | 310/68 B |
| 2010/0270093 A1* | 10/2010 | Sagara et al. | 180/65.1 |
| 2012/0104882 A1* | 5/2012 | Pan | 310/51 |

* cited by examiner

ROTOR ASSEMBLY

CROSS-REFERENCE TO RELATED APPLICATIONS

Pursuant to 35 U.S.C. §119 and the Paris Convention Treaty, this application claims the benefit of Chinese Patent Application No. 201120034755.5 filed Jan. 28, 2011, the contents of which are incorporated herein by reference.

BACKGROUND OF THE INVENTION

1. Field of the Invention

The invention relates to a rotor assembly of a brushless motor.

2. Description of the Related Art

Conventionally, a rotor assembly of a brushless DC motor generally includes a rotating shaft, a rotor core, a permanent magnet, a magnetic ring support, and a magnetic ring. The permanent magnet is mounted on the outer side surface of the rotor core and the magnetic ring is nested on the magnetic ring support. Because conventional magnetic ring supports of rotor assemblies are made of aluminum and fixed by rivets, they are complicated in working and mounting procedures and have poor positions after assembly.

SUMMARY OF THE INVENTION

In view of the above-described problems, it is one objective of the invention to provide a rotor assembly of a brushless motor in which a magnetic ring support and a rotor core are made as a whole by injection molding. Such a structure has the advantages of simplicity, excellent positions, free mounting, reduced working procedures and labor costs, and improved assembly efficiency.

To achieve the above objective, in accordance with one embodiment of the invention, there provided is a rotor assembly of a brushless motor, comprising a rotating shaft, a rotor core, a permanent magnet, a magnetic ring support, and a magnetic ring, wherein the permanent magnet is mounted on the outer side surface of the rotor core, the magnetic ring is nested on the magnetic ring support, and the magnetic ring support and the rotor core are made as a whole by injection molding.

In a class of this embodiment, the magnetic ring support comprises a support body and a connecting cylinder; the support body is against one end surface of the rotor core; the connecting cylinder is projected from the bottom of the support body and extends through a through hole of the rotor core, and a raised edge arranged at the bottom of the connecting cylinder presses on the other end surface of the rotor core.

In a class of this embodiment, a plurality of bosses are projected from an outer wall surface of the magnetic ring support; each boss forms a step surface with the outer wall surface of the magnetic ring support, and the magnetic ring is nested on the outer wall surface of the magnetic ring support and locked on the step surface.

In a class of this embodiment, one end of the magnetic ring support is arranged with a plurality of positioning recesses and a plurality of blocks projected from an inner wall surface of the magnetic ring are locked in the positioning recesses.

In a class of this embodiment, a distance is formed in the axial direction between the magnetic ring and the permanent magnet arranged on the outer side surface of the rotor core, and the magnetic ring is flush with the outer side surface of the permanent magnet.

In a class of this embodiment, an inner side surface of the magnetic ring support is arranged with a plurality of ribs.

In a class of this embodiment, the magnetic ring support is made of plastics.

Advantages of the invention are summarized below:

1) the magnetic ring support and the rotor core are made as a whole by injection molding. The magnetic ring support comprises a support body and a connecting cylinder, in which the support body is against one end surface of the rotor core, the connecting cylinder projected from the bottom of the support body extends through a through hole of the rotor core, and a raised edge arranged at the bottom of the connecting cylinder presses on the other end surface of the rotor core. Such a structure has the advantages of simplicity, excellent positions, free mounting, reduced working procedures and labor costs, and improved assembly efficiency;
2) the magnetic ring support is made of plastics, thus the costs are low;
3) the end of the magnetic ring support is arranged with a plurality of positioning recesses and a plurality of blocks projected from the inner wall surface of the magnetic ring are locked in the positioning recesses. Such a structure is helpful for positioning the magnetic ring and is mounting friendly;
4) the inner side surface of the magnetic ring support is arranged with a plurality of ribs to fasten the magnetic ring support, therefore the magnetic ring is unlikely to deform; and
5) a plurality of bosses are projected from the outer wall surface of the magnetic ring support, each boss forms a step surface with the outer wall surface of the magnetic ring support, and the magnetic ring is nested on the outer wall surface of the magnetic ring support and locked on the step surface. Such a structure is firm and mounting friendly.

DETAILED DESCRIPTION OF THE EMBODIMENTS

Figure 1:
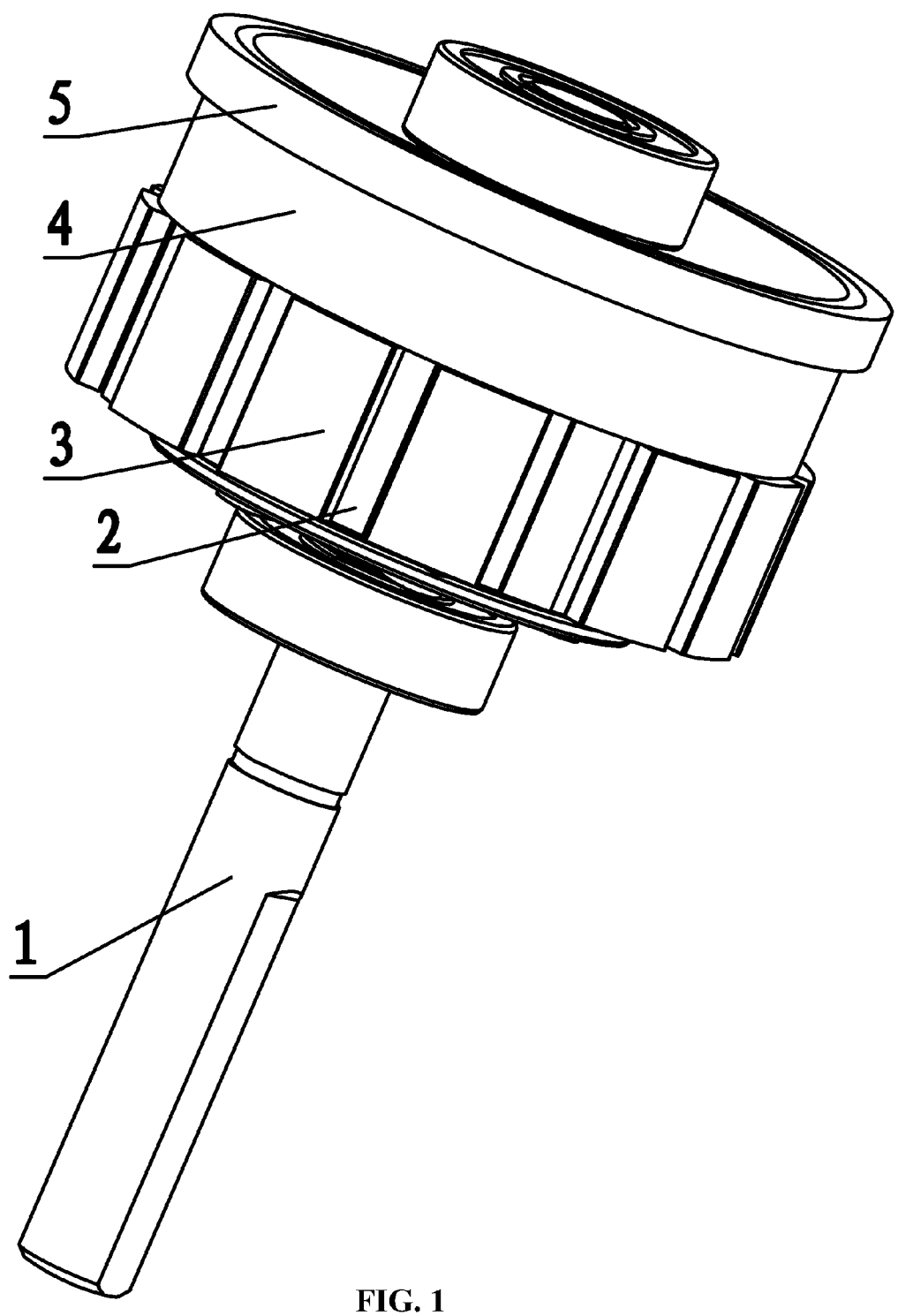
FIG. 1 is a three-dimensional diagram of a rotor assembly of a brushless motor of one embodiment of the invention.
Figure 2:
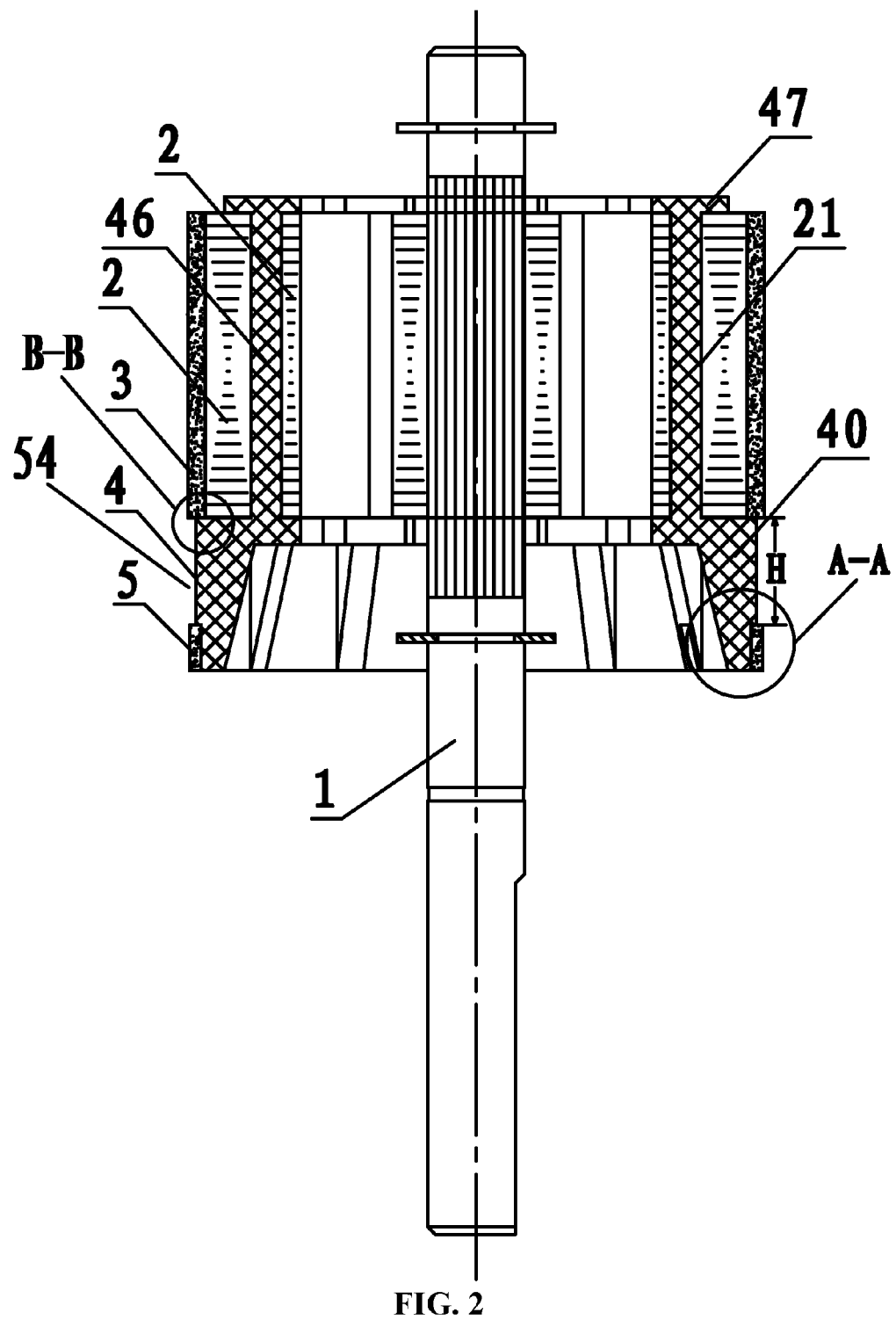
FIG. 2 is a sectional view of a rotor assembly of a brushless motor of one embodiment of the invention.
Figure 3:
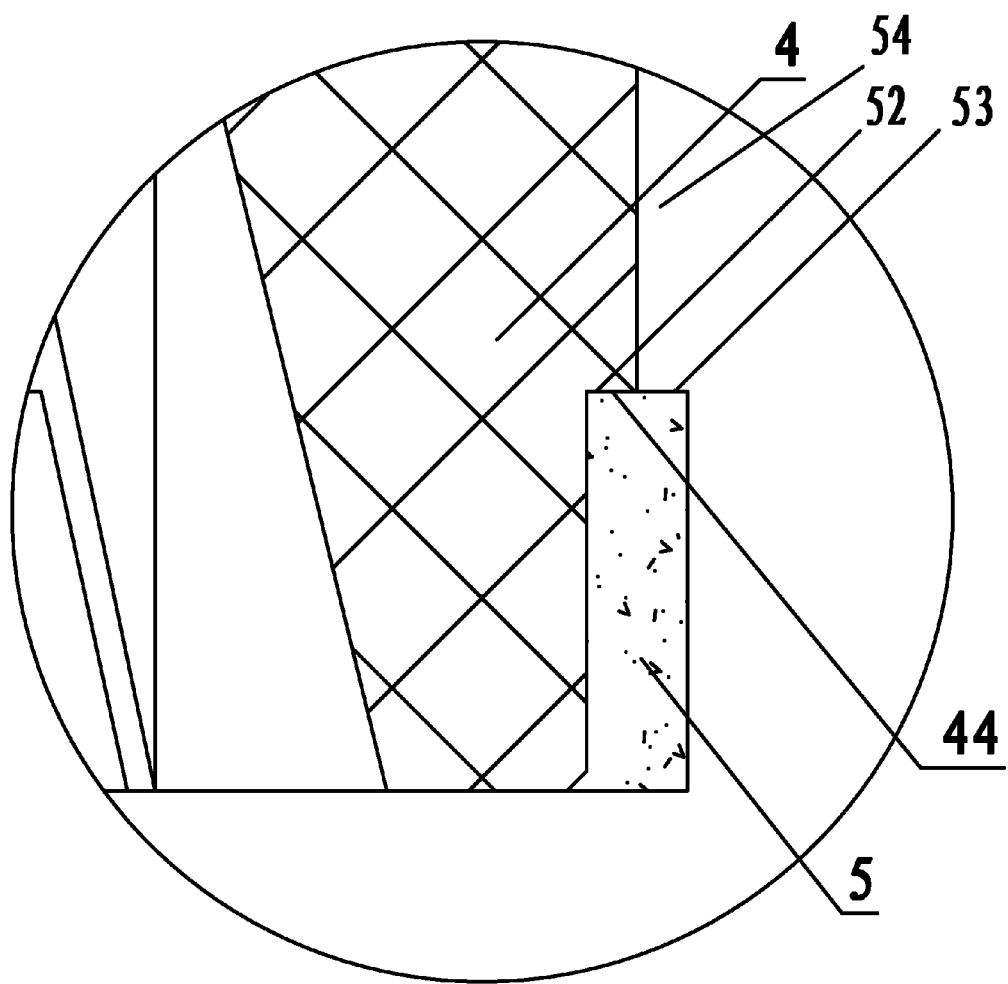
FIG. 3 is a partially enlarged view of A-A of FIG. 2.
Figure 4:
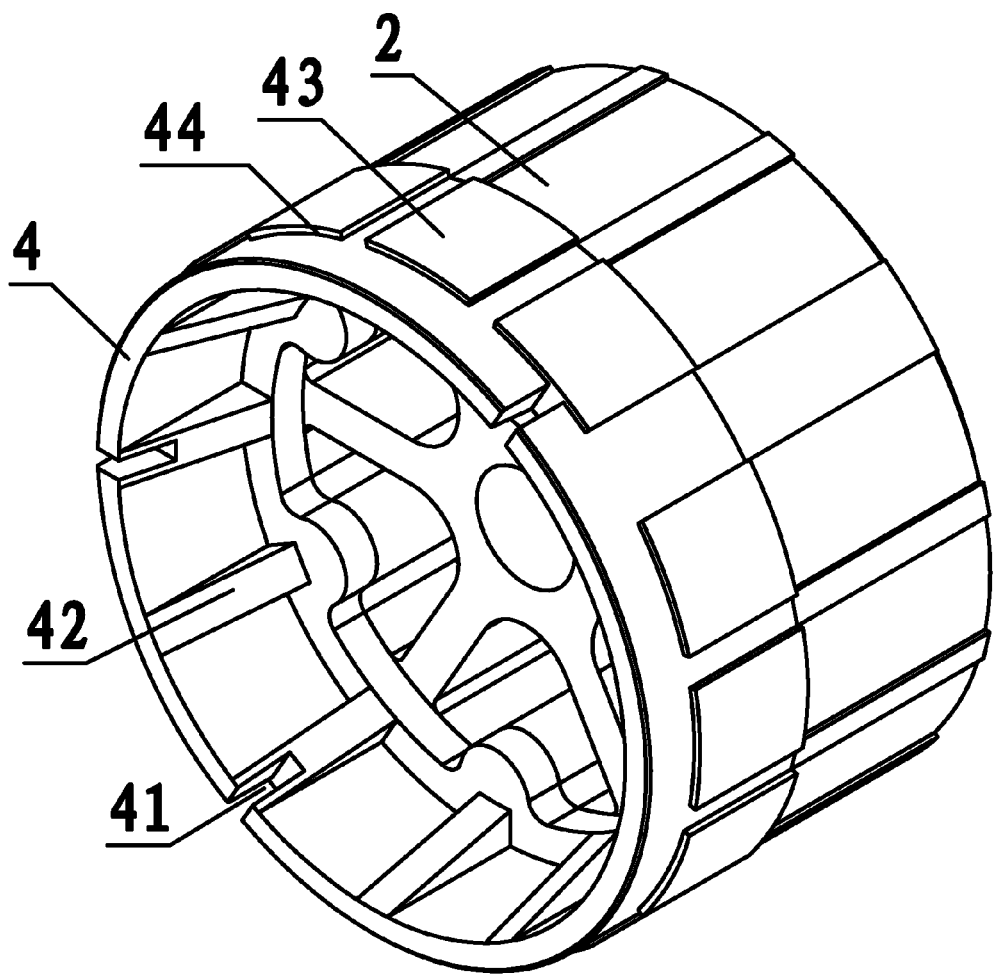
FIG. 4 is a three-dimensional diagram of a rotor core support of a rotor assembly of a brushless motor of one embodiment of the invention.
Figure 5:
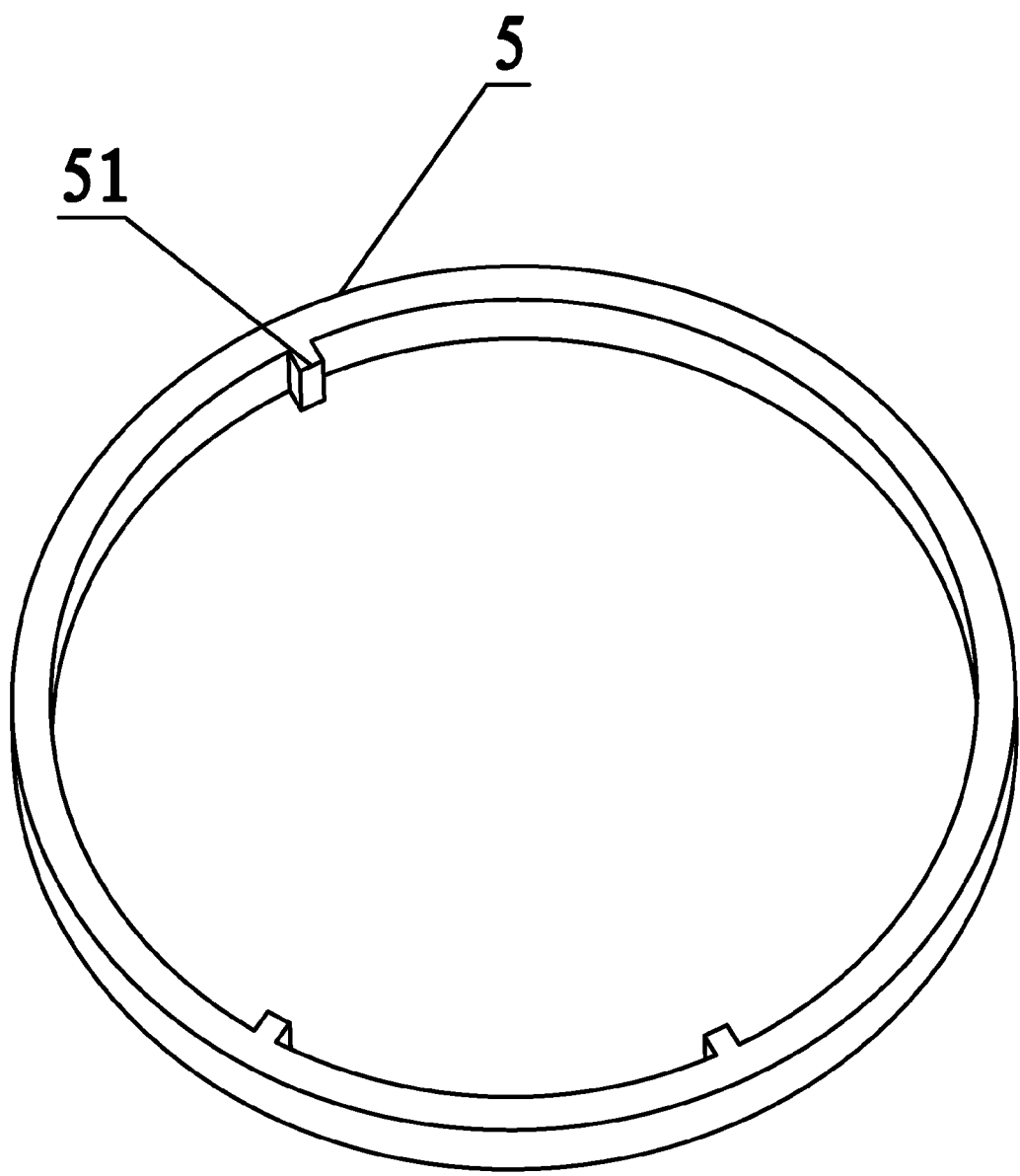
FIG. 5 is a three-dimensional diagram of a magnetic ring of a rotor assembly of a brushless motor of one embodiment of the invention.
Figure 6:
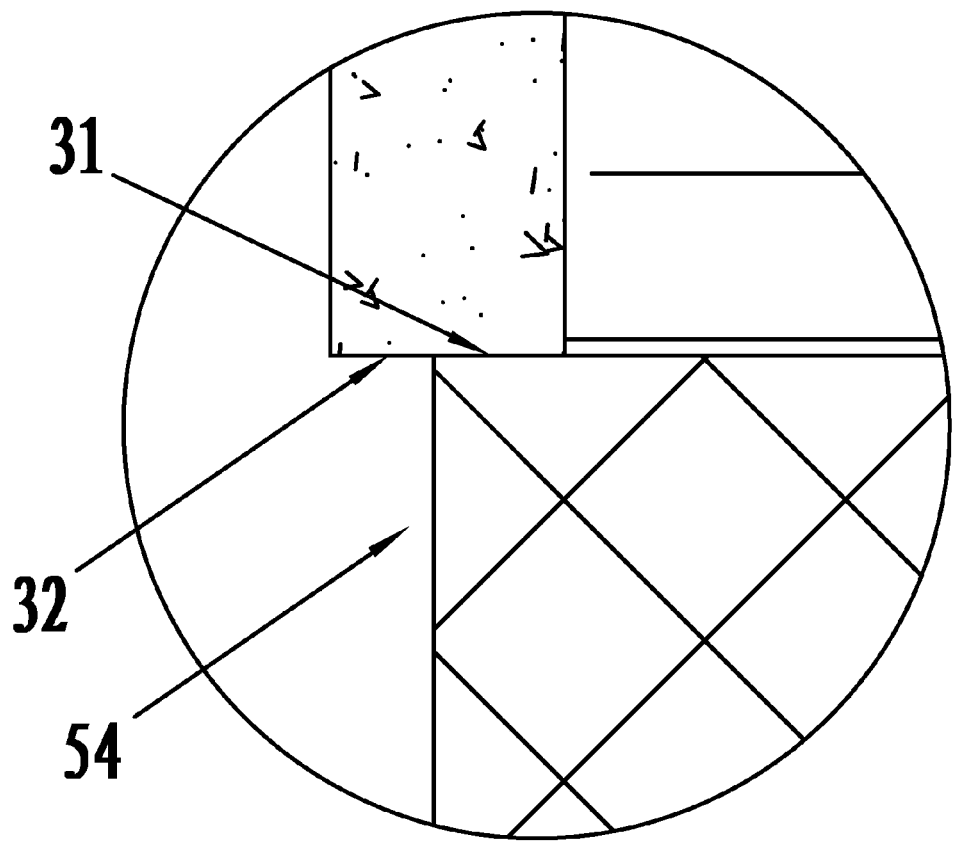
FIG. 6 is a partially enlarged view of B-B of FIG. 2.

As shown in FIGS. 1-6, a rotor assembly of a brushless motor, in accordance with the invention, comprises a rotating shaft 1, a rotor core 2, a permanent magnet 3, a magnetic ring support 4, and a magnetic ring 5. The permanent magnet 3 is mounted on the outer side surface of the rotor core 2, and the end surface of the permanent magnet 3 comprises a first part 31 and a second part 32. The magnetic ring 5 is nested on the magnetic ring support 4, and the magnetic ring support 4 and the rotor core 2 are made as a whole by injection molding. The magnetic ring support 4 comprises a support body 40 and a connecting cylinder 46, in which the support body 40 is against one end surface of the rotor core 2, and the connecting cylinder 46 projected from the bottom of the support body 40 extends through a through hole 21 of the rotor core 2. A raised edge 47 arranged at the bottom of the connecting cylinder 46 presses on the other end surface of the rotor core 2. A plurality of bosses 43 are projected from the outer wall surface of the magnetic ring support 4 and each boss 43 forms a step surface 44 with the outer wall surface of the magnetic ring support 4. The magnetic ring 5 is nested on the outer wall surface of the magnetic ring support 4 and locked on the step surface 44. One end of the magnetic ring support 4 is arranged with a plurality of positioning recesses 41 and a plurality of blocks 51 projected from the inner wall surface of the magnetic ring 5 are locked in the positioning recesses 41. The end surface of the magnetic ring 5 comprises a first part 52 and a second part 53. An air gap 54 is formed between the second part 32 of the end surface of the permanent magnet 3 and the second part 53 of the end surface of the magnetic ring 5. A certain distance H is formed in the axial direction between the magnetic ring 5 and the permanent magnet 3 that is arranged on the outer side surface of the rotor core 2, and the magnetic ring 5 is flush with the outer side surface of the permanent magnet 3. The inner side surface of the magnetic ring support 4 is arranged with a plurality of ribs 42 and the magnetic ring support 4 is made of plastics.

A rotor assembly of a brushless motor, in accordance with the invention, comprises a rotating shaft 1, a rotor core 2, a permanent magnet 3, a magnetic ring support 4, and a magnetic ring 5. The permanent magnet 3 is mounted on the outer side surface of the rotor core 2, and the end surface of the permanent magnet 3 comprises a first part 31 and a second part 32. The magnetic ring 5 is nested on the magnetic ring support 4, and the magnetic ring support 4 and the rotor core 2 are made as a whole by injection molding. The magnetic ring support 4 comprises a support body 40 and a connecting cylinder 46, in which the support body 40 is against one end surface of the rotor core 2, and the connecting cylinder 46 projected from the bottom of the support body 40 extends through a through hole 21 of the rotor core 2. A raised edge 47 arranged at the bottom of the connecting cylinder 46 presses on the other end surface of the rotor core 2. The end surface of the magnetic ring 5 comprises a first part 52 and a second part 53. An air gap 54 is formed between the second part 32 of the end surface of the permanent magnet 3 and the second part 53 of the end surface of the magnetic ring 5. Such a structure has the advantages of simplicity, excellent positions, free mounting, reduced working procedures and labor costs, and improved assembly efficiency.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A rotor assembly, comprising:
   a) a rotating shaft;
   b) a rotor core comprising an outer side surface and two end surfaces;
   c) a permanent magnet comprising an end surface, the end surface of the permanent magnet comprising a first part and a second part;
   d) a magnetic ring support having an outer wall surface; and
   e) a magnetic ring comprising an end surface, the end surface of the magnetic ring comprising a first part and a second part;
   wherein:
   the permanent magnet is mounted on the outer side surface of the rotor core;
   the magnetic ring support and the rotor core are made as a whole by injection molding;
   the magnetic ring support comprises a support body and a connecting cylinder;
   the support body is disposed against one end surface of the rotor core and against the first part of the end surface of the permanent magnet, wherein the permanent magnet is supported by the support body;
   the first part of the end surface of the permanent magnet is in contact with the support body and the second part of the end surface of the permanent magnet protrudes out of the support body;
   the connecting cylinder is projected from the support body and extends through a through hole of the rotor core;
   the connecting cylinder is spaced from the permanent magnet by the rotor core;
   a raised edge is arranged at an end of the connecting cylinder;
   the raised edge presses on the other end surface of the rotor core;
   the raised edge is spaced from the permanent magnet and does not contact the permanent magnet;
   the raised edge is spaced from the rotating shaft and does not contact the rotating shaft;
   a plurality of bosses are projected from the outer wall surface;
   each of the plurality of bosses comprises a top surface;
   a step surface is formed between the top surface and the outer wall surface;
   the magnetic ring is nested on the outer wall surface and locked by the step surface;
   the first part of the end surface of the magnetic ring is in contact with the step surface and the second part of the end surface of the magnetic ring protrudes out of the step surface; and
   an air gap is formed between the second part of the end surface of the permanent magnet and the second part of the end surface of the magnetic ring.

2. The rotor assembly of claim 1, wherein one end of the magnetic ring support is arranged with a plurality of positioning recesses and a plurality of blocks projected from an inner wall surface of the magnetic ring are locked in the positioning recesses.

3. The rotor assembly of claim 2, wherein a distance is formed in the axial direction between the magnetic ring and the permanent magnet arranged on the outer side surface of the rotor core, and the magnetic ring is flush with an outer side surface of the permanent magnet.

4. The rotor assembly of claim 2, wherein an inner side surface of the magnetic ring support is arranged with a plurality of ribs.

5. The rotor assembly of claim 1, wherein the magnetic ring support is made of plastics.

* * * * *